United States Patent Office 2,769,002
Patented Oct. 30, 1956

2,769,002

PREPARATION OF PHENTHIAZINE COMPOUNDS

Paul Jean Clément Buisson and Paul Gailliot, Paris, and Jacques Gaudechon, Thiais, France, assignors to Societe des Usines Chimiques Rhone-Poulenc, Paris, France, a corporation of France No Drawing. Application March 1, 1954,
Serial No. 413,424

Claims priority, application Great Britain April 8, 1953

3 Claims. (Cl. 260—243)

This invention is for improvements in or relating to the production of phenthiazines and N-substituted phenthiazines.

Many phenthiazines substituted on the ring nitrogen atom by an aminoalkyl group (in which the terminal amino group is tertiary) are of therapeutic interest and a particularly important class are the compounds of the type:

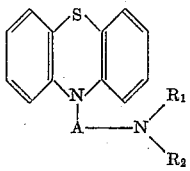

in which A represents a straight or branched aliphatic chain containing either two or three carbon atoms, $R_1$ and $R_2$ either represent lower alkyl groups (preferably methyl or ethyl) or together complete a pyrrolidine or piperidine ring and the phenthiazine ring either carries no other substituent or, if further substituted, at least carries in the 1- or 3-position (Beilstein nomenclature) a substituent in the form of a halogen atom (preferably chlorine or bromine) or a lower alkyl (preferably methyl or ethyl), lower alkoxy such as methoxy or phenoxy group. The term "lower" as used in this specification and in the appended claims signifies that the group in relation to which the term is used contains not more than 4 carbon atoms.

These substituted phenthiazines are usually prepared by processes which involve substitution on the ring nitrogen atom of a phenthiazine, itself prepared by the cyclisation, by means of sulphur, of an appropriate diphenylamine. Where a 1- or 3-substituted product is required, the starting material is a corresponding meta-substituted diphenylamine which, because of the nature of the cyclisation reaction, leads to a mixture of 1- and 3-substituted phenthiazines from which the desired isomer must then be separated, if such a separation step is to be avoided after the N-substitution reaction.

It is the object of the present invention to provide a new process for the production of phenthiazines and N-aminoalkyl-phenthiazines which is applicable not only to such of these compounds as are mono-substituted in the 10-position but also those that contain a substituent in the 1- or 3-position, without the complication of isomer formation and in commercial yield.

The process of the present invention comprises bringing about cyclisation, in the presence of an acid binding agent, of a diphenylsulphide ortho-substituted in one ring by the group —NHZ where Z represents hydrogen or an aminoalkyl group (in which the terminal nitrogen atom is tertiary) and in the other ring by a halogen atom, all of the remaining positions being unsubstituted or at least one of the remaining positions (preferably ortho or para) being substituted by a halogen atom or a lower alkyl, lower alkoxy or a phenoxy group, in an anhydrous solvent at elevated temperature, preferably at or near to the boiling point of the reaction mixture at the pressure employed.

If a 1-substituted phenthiazine compound is desired (to the exclusion of the 3-isomer) the diphenylsulphide is correspondingly substituted in the ortho-position; similarly the 3-substituted isomer solely is obtained using a correspondingly para-substituted diphenylsulphide.

The reaction may be represented schematically thus:

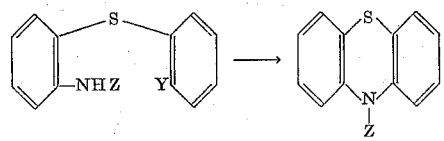

where Y represents a halogen atom (preferably bromine) and Z represents hydrogen or an aminoalkyl group, substituted on the terminal nitrogen atom, preferred examples of the aminoalkyl group being:

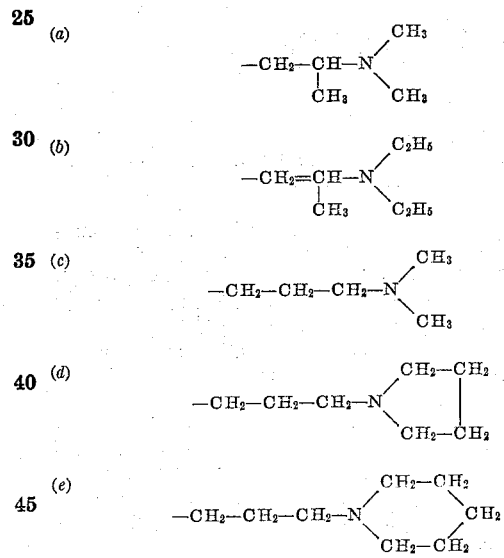

Optionally in the case of (a) and (b), and preferably in the case of (c), (d) and (e), the diphenylsulphide contains additionally a chlorine or bromine atom in the ortho- or para-position.

Preferred solvents are the N-substituted amides of fatty acids containing not more than 3 carbon atoms, e. g. dimethylformamide and N-methylacetamide, of which the former is preferred. The cyclisation is conveniently brought about by refluxing the reaction mixture. As the acid binding agent, it is preferred to employ potassium carbonate or sodium carbonate; however other agents such as caustic soda can also be used. In some cases (such as when an alkali carbonate is employed) the reaction can be accelerated by means of a dehydrohalogenation catalyst such as copper powder.

The process of this invention is illustrated by the following examples.

*Example 1*

2-bromo - 2' - (3" - dimethylaminopropyl) - amino-4'-chloro-diphenylsulphide (10 g.) is dissolved in dimethylformamide (80 cc.). To this solution is added potassium carbonate (5 g.) and copper powder (0.4 g.). It is then heated under reflux for 48 hours, cooled, and the insoluble matter filtered off. After washing with dimethylformamide (20 cc.), the filtrate is taken up in distilled water (200 cc.). The base formed is extracted with ether (3 times with 50 cc.), the ethereal solution is dried over sodium sulphate, the ether driven off on a water-bath and the residue distilled. In this way there is obtained 3 - chloro - 10 - (3' - dimethylaminopropyl)-phenthiazine (6.4 g.) which boils at 210–225° C. under 0.7 mm. of mercury. The hydrochloride is made by the action of ethereal hydrogen chloride on the base dissolved in acetone; this hydrochloride melts at 180° C. The picrate melts at 171–172° C.

The 2-bromo - 2' - (3''-dimethylaminopropyl)-amino-4'-chloro-diphenylsulphide (B. P.$_{0.5}$=200–220° C.; M. P. cap.=70–72° C.), employed as starting material is obtained by the action of 1-dimethylamino-3-chloropropane on 2-bromo-2'-amino-4'-chloro-diphenylsulphide in xylene solution in the presence of sodamide.

Example II

Operating in the same way as in Example I but starting from 2 - bromo - 2' - (2'' - dimethylaminopropyl)-amino - diphenylsulphide (15.9 g.), dimethylformamide (120 cc.), potassium carbonate (8 g.) and copper powder (0.6 g.) there is obtained 10-(2'dimethylaminopropyl)-phenthiazine (8.45 g.) (B. P.$_{0.65}$=190–200° C.), the hydrochloride and picrate of which melt at about 215–220° C. and at 167–168° C., respectively.

The 2-bromo - 2' - (2''-dimethylaminopropyl)-amino-diphenylsulphide (B. P.$_{0.8}$=200–225° C.) employed as starting material is prepared by the action of 1-dimethylamino-2-chloropropane on 2-bromo-2'-amino-diphenylsulphide in xylene solution in the presence of sodamide.

Example III

Operating as in Example I, but starting from 2-bromo-2'-(3''-diethylaminopropyl) - amino - 4' - chloro-diphenylsulphide (10 g.), there is obtained 3-chloro-10-(3'-diethylaminopropyl)-phenthiazine (5.8 g.) which boils at 225–240° C. under a pressure of 1 mm. of mercury, and the hydrochloride and maleate of which are identical to those of a product prepared by another method (melting points and mixed melting points).

The 2-bromo - 2' - (3'' - diethylaminopropyl) - amino-4'-chloro-diphenylsulphide (B. P.$_{0.65}$=220–235° C.), employed as starting material is obtained by the action of 1-diethylamino-3-chloropropane on 2-bromo-2'-amino-4'-chloro-diphenylsulphide in xylene solution in the presence of sodamide.

Example IV

By operating as in Example I, but starting with 10 g. of 2 - bromo - 2' - (3'' - dimethylaminopropyl) - amino-4'-methyl-diphenylsulphide, there is obtained 6.25 g. of 3-methyl - 10 - (3' - dimethylaminopropyl) - phenthiazine which boils at 190–210° C. under 0.5 mm. of mercury. The hydrochloride and the picrate of the product obtained are identical with those of a product prepared by another method as determined by melting points and mixed melting points.

The starting material, 2-bromo-2'-(3''-dimethylaminopropyl)-amino-4'-methyl-diphenylsulphide (B. P. $_{0.6-0.7}$=200–230° C.)

is obtained by reacting 1-dimethylamino-3-chloropropane with 2-bromo-2'-amino-4'-methyl-diphenylsulphide in xylene solution in the presence of sodamide.

Example V

Operating as in Example I, but from 2-bromo-2'-(3'' - dimethylaminopropyl)-amino-4'-methoxy-diphenylsulphide (14.25 g.), dimethylformamide (114 cc.), potassium carbonate (7.1 g.) and copper powder (0.6 g.), there is obtained 3-methoxy-10-(3'-dimethylaminopropyl)-phenthiazine (10.2 g.) which boils at 210–225° C. under 1 mm. of mercury and the maleate and picrate of which are identical with those of a product prepared by another method, as determined by melting points and mixed melting points. The 2-bromo-2'-(3''-dimethylaminopropyl) - amino - 4'-methoxy-diphenylsulphide (B. P. $_{0.7}$=210–230° C., M. P.=52–55° C. (cap.)) which serves as starting material, is obtained by the action of 3-dimethylamino-1-chloropropane on 2-bromo-2'-amino-4'-methoxy-diphenylsulphide in xylene solution, in the presence of sodamide.

Example VI

An agitated mixture of 2-bromo-2'-(3''-dimethylaminopropyl)-amino-4'-chloro-diphenylsulphide (10 g.), dimethylaniline (80 cc.), anhydrous potassium carbonate (5 g.) and copper powder (0.4 g.) is heated at 170° C. for 48 hours. After cooling, water (200 cc.) is added and the solution is filtered. The organic layer of the filtrate is separated and the aqueous layer is extracted with ether (3 times with 50 cc.). The combined organic layers are then dried over sodium sulphate and, after filtration and washing the residue with ether, the ether is driven off by heating on a water bath and the residue is then rectified. Dimethylaniline passes over first at about 45–60° C. under 0.5 mm., and then at 190–220° C. under 0.4 mm. 3-chloro-10-(3'-dimethylaminopropyl)-phenthiazine (8.20 g.), already described in Example I, is obtained.

Example VII

Operating in the same way as in Example VI but by replacing the potassium carbonate with powdered caustic soda (3 g.), there is obtained 3-chloro-10-(3'-dimethylaminopropyl)-phenthiazine (6.8 g.).

Example VIII

An agitated mixture of 2-bromo-2'-(3''-dimethylaminopropyl)-amino-4'-chloro-diphenylsulphide (12 g.), N-methylacetamide (100 cc.), anhydrous potassium carbonate (6 g.) and copper powder (0.5 g.) is heated for 48 hours at 170° C. After cooling, water (250 cc.) and ether (50 cc.) are added and the solution is filtered. The ethereal layer is separated and the aqueous layer is extracted with ether (4 times with 50 cc.). The ethereal extracts are then combined and dried over sodium sulphate. The ether is driven off by heating on a water bath, and by rectification of the residue 3-chloro-10-(3'-dimethylaminopropyl)-phenthiazine (6.6 g.) is obtained.

Example IX 2-bromo-2'-amino-4'-chloro-diphenylsulphide (5 g.) is dissolved in dimethylformamide (40 cc.) and to the solution there are added potassium carbonate (2.5 g.) and copper powder (0.2 g.). The mixture is heated under reflux, a gentle stream of nitrogen being passed therethrough, until evolution of carbon dioxide ceases. The insoluble inorganic matter is separated by filtration and 100 cc. of water is added to the filtrate. 3-chloro-phenthiazine is precipitated as a voluminous, amorphous whitish powder which is then filtered off, washed with water and dried in vacuo in the presence of phosphoric anhydride. There are obtained 3.5 g. of product, representing a yield of 94.3%, melting at 198–199° C. Recrystallisation from chlorobenzene gives beautiful silvery scales melting at 201° C. (instantaneous melting point on the Maquenne block). A nitrogen determination gives 6.0% (calculated from C$_{12}$H$_8$NClS: 5.99%).

The 2-bromo-2'-amino-4'-chloro-diphenylsulphide used as starting material may be obtained by the reduction, using stannous chloride in hydrochloric acid medium, of the corresponding nitro derivative, itself prepared from 2-bromo-thiophenol, cf. Schwarzenbach, Helv., 17, 1176 (1934) and Wilson, J. A. C. S., 72, 5204 (1950), and 2:5-dichloronitrobenzene cf. Morgan, J. C. S., 81, 1352 (1902).

Example X 2-bromo-2'-amino-diphenylsulphide (5.6 g.) is dissolved in dimethylformamide (40 cc.), potassium carbonate (3.1 g.), and copper powder (0.2 g.) are added to the solution, and the mixture heated under reflux for 32 hours, a gentle stream of nitrogen being bubbled therethrough. The insoluble matter is separated by filtration and 150 cc. of water are added to the filtrate. The resulting precipitate is filtered off, washed with water and dried under vacuum. In this way there is obtained phenthiazine (3.95 g.) melting at 176–178° C. One recrystallisation from ethyl alcohol raises the melting point to 180–182° C.

The 2-bromo-2'-amino-diphenylsulphide (M. P. 57° C.) is obtained by stannous chloride reduction of the corresponding nitro derivative (M. P. 111.5° C.), itself prepared from 2-bromo-thiophenol and 2-chloro-nitrobenzene.

Example XI 2-bromo-2'-amino-5'-chloro-diphenylsulphide (10 g.) is dissolved in dimethylformamide (80 cc.) and potassium carbonate (5 g.) and copper powder (0.4 g.) are added to the solution and the mixture heated under reflux, a gentle stream of nitrogen being bubbled therethrough. After reaction, the product is treated as in the preceding example and, after recrystallisation from chlorobenzene of the crude precipitated product, there is obtained the 2-chloro-phenthiazine melting at 196° C. A further crystallisation raises the melting point to 199° C.

The 2-bromo-2'-amino-5'-chloro-diphenylsulphide is obtained by stannous chloride reduction of the corresponding nitro derivative prepared from 2-bromo-thiophenol and 2:4-dichloronitrobenzene.

Example XII 2-bromo-2'-amino-3'-chloro-diphenylsulphide (2.1 g.) melting at 84°–85° C., dimethylformamide (20 cc.), potassium carbonate (1.1 g.) and copper powder (0.1 g.) are heated in a metal bath at 160°–165° C. for 48 hours. The insoluble material is then separated by filtration. Water (200 cc.) is added to the filtrate and after the solution has been left for 24 hours in a refrigerator the product is filtered off, washed with a little water and dried in vacuo. There is thus obtained 4-chloro-phenthiazine (1.1 g.) melting at 90° C. as a greyish powder in a yield of 70% of theory.

The 4-chloro-phenthiazine may be purified by recrystallisation from isopropanol when it then forms crystals in thin plates, melting at 92° C. which are unstable in air.

We claim:

1. A process for the production of a phenthiazine compound of the general formula:

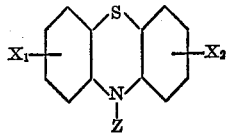

which comprises heating under reflux in the presence of an alkali metal carbonate and in an anhydrous solvent medium of dimethyl formamide a compound of the general formula:

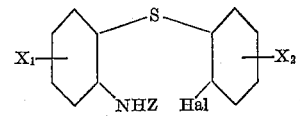

where Z is selected from the class consisting of the hydrogen atom and a group of the formula:

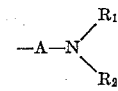

where A is an alkylene group containing from 2 to 5 carbon atoms, $R_1$ and $R_2$ are selected from the class consisting of lower alkyl groups and $X_1$ and $X_2$ are selected from the class consisting of hydrogen, halogen, lower alkyl and lower alkoxy, the said compound being in solution in said medium.

2. A process according to claim 1 wherein the reaction is effected in the presence of copper powder as dehydrohalogenation catalyst.

3. A process for the production of a phenthiazine compound of the general formula:

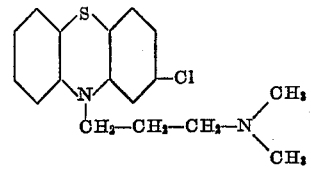

which comprises heating under reflux a compound of the formula:

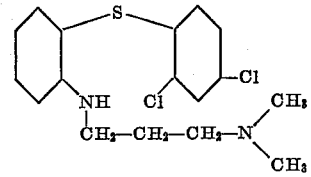

with an alkali metal carbonate in a dimethyl formamide solvent medium and in the presence of copper powder, substantially at the boiling point of the medium.

References Cited in the file of this patent

UNITED STATES PATENTS 2,645,640   Charpentier _____ July 14, 1953

OTHER REFERENCES

Michels et al.: "JACS" (1950), vol. 72, pp. 888–92.